UNITED STATES PATENT OFFICE.

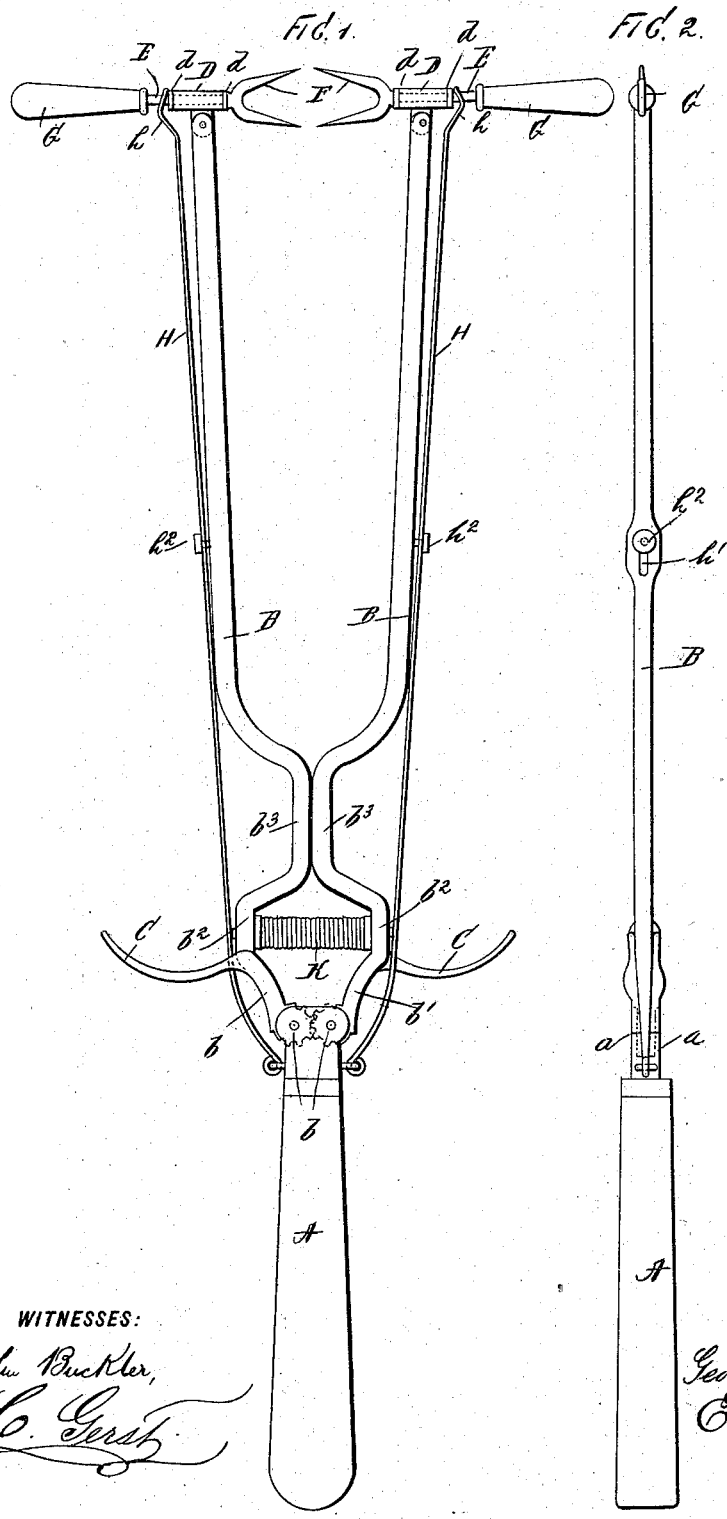

GEORGE ALBRECHT, OF PHILADELPHIA, PENNSYLVANIA.

CORN-HOLDER.

SPECIFICATION forming part of Letters Patent No. 557,935, dated April 7, 1896.

Application filed October 7, 1895. Serial No. 564,842. (No model.)

*To all whom it may concern:*

Be it known that I, GEORGE ALBRECHT, a citizen of the United States, and a resident of Philadelphia, in the county of Philadelphia and State of Pennsylvania, have invented certain new and useful Improvements in Corn-Holders, of which the following is a specification, reference being had to the accompanying drawings, forming a part thereof, in which similar letters of reference indicate corresponding parts.

This invention relates to table implements, and particularly to that class thereof known as corn-holders; and the object thereof is to provide an implement of this class by means of which an ear of hot corn may be held and manipulated without applying the hands thereto.

The invention is fully disclosed in the following specification, of which the accompanying drawings form a part, in which—

Figure 1 is a side elevation of my improved corn-holder, and Fig. 2 an edge view thereof.

In the practice of my invention I provide a handle A, with which is pivotally connected two side arms B, each of which is provided with a circular head $b$, having gear-teeth formed thereon, and in practice I prefer to form jaws $a$ on the end of the handle between which the heads $b$ are pivoted.

The arms B, adjacent to the heads $b$, are outwardly curved, as shown at $b'$, and at the outer ends of these curves are formed curved projections C, the convex portions of which are in the direction of the handle and above which the arms are parallel, as shown at $b^2$, above which they are preferably contracted or brought together for a short distance, as at $b^3$, and they are then outwardly curved and extended, and to the end of each is pivotally secured a transverse tubular casing D, in each of which is loosely mounted a shaft E, on which are placed or formed annular heads or shoulders $d$, and the inner end of each shaft is provided with a fork F, adapted to be inserted into the end of an ear of corn.

The outer ends of the shafts E are each provided with an extension or handle G, and mounted on each shaft, between the outer heads $d$ and the extension or handle, is a rod H, which extends along the outer side of the arms B, and are pivotally connected with the handle A, just below the heads $b$, of the arms B.

The shafts E extend through the upper or outer ends of the rods H, and said ends are outwardly and inwardly curved or bent, as shown at $h$, and said rods are connected with the arms B, near the middle thereof, by means of slots $h'$, through which pass screws or bolts $h^2$, and between the parallel parts $b^2$ of the arms B is secured a contractile spring K.

The curved projections C are formed on the sides of the adjacent portions of the arms B, so that the rods H may extend parallel with and adjacent to the sides of said arms, and the operation will be readily understood in view of the foregoing description when taken in connection with the accompanying drawings.

By pulling downwardly on either or both of the projections C the arms B will be separated at their outer ends, and in any position of said arms the shafts E and forks F will be held in horizontal line by the rods H, and an ear of corn of any length may be placed between the forks F and securely held thereby, and, as will be readily understood, the spring K operates to draw said forks together and to securely hold the ear of corn.

The shafts E are revoluble in the tubular casings D, and the ear of corn may thus be turned while being held by the forks without removing either of the latter from the ends thereof, and it will thus be seen that I accomplish the object of my invention by means of a device which is simple in construction and operation, and one which is comparatively inexpensive, and one which is perfectly adapted to accomplish the result for which it is intended.

My invention is not limited to the exact form, construction, and arrangement of parts shown and described, and I therefore reserve the right to make all such alterations therein and modifications thereof as fairly come within the scope of the invention.

Having fully described my invention, I claim and desire to secure by Letters Patent—

1. A corn-holder, comprising a handle, two side arms pivotally connected therewith, at one end thereof, and each of which is provided with a circular head having gear-teeth formed thereon, said arms being also provided at their outer ends with tubular casings, which are pivotally connected therewith, a shaft extending through each of said tubular casings, each of said shafts provided with a fork at its inner end and means for operating said arms, substantially as shown and described.

2. A corn-holder, comprising a handle, two side arms pivotally connected therewith at one end thereof, and each of which is provided with a circular head having gear-teeth formed thereon, said arms being also provided at their outer ends with tubular casings, which are pivotally connected therewith, a shaft extending through each of said tubular casings, each of said shafts provided with a fork at its inner end, and means for operating said arms, comprising rods, one of which is connected with each of said shafts at one end, said rods being pivotally connected with the handle at the other end, and said arms being also provided near the handle with curved projections, and being also connected by means of a spiral spring, which operates to draw the arms together, substantially as shown and described.

3. In a corn-holder, the combination with a handle, of two side arms pivotally connected therewith, at one end thereof, each of said arms being provided with a circular head having gear-teeth formed thereon, said arms being also connected near the handle, by a spiral spring which operates to draw them together, and said arms being also provided at their outer ends, each, with a tubular casing pivotally secured thereto, and through which passes a revoluble shaft, each of said shafts provided at its inner ends with a prong or fork, and side rods pivotally connected with each side of the handle, and extending along the arms, and provided at their outer ends with holes or openings, through which said shafts pass, said rods being also provided near their middles, with slots through which pass screws or bolts by which they are connected with the side arms, and said arms being provided near the handle with curved projections, substantially as shown and described.

In testimony that I claim the foregoing as my invention I have signed my name, in presence of the subscribing witnesses, this 1st day of October, 1895.

GEORGE ALBRECHT.

Witnesses:
P. O'DONNELL,
F. L. ROEPKE.